(12) United States Patent
Hsu

(10) Patent No.: US 11,755,123 B2
(45) Date of Patent: Sep. 12, 2023

(54) ILLUMINATED KEYBOARD

(71) Applicant: Lite-On Technology Corporation, Taipei (TW)

(72) Inventor: Chin-Chia Hsu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 17/579,608

(22) Filed: Jan. 20, 2022

(65) Prior Publication Data

US 2022/0244792 A1 Aug. 4, 2022

Related U.S. Application Data

(60) Provisional application No. 63/145,490, filed on Feb. 4, 2021.

(30) Foreign Application Priority Data

Dec. 3, 2021 (CN) .......................... 202123020429.1

(51) Int. Cl.
*F21V 8/00* (2006.01)
*G06F 3/02* (2006.01)
*H01H 13/83* (2006.01)

(52) U.S. Cl.
CPC ........... *G06F 3/021* (2013.01); *G02B 6/0035* (2013.01); *G02B 6/0055* (2013.01); *G02B 6/0066* (2013.01); *H01H 13/83* (2013.01)

(58) Field of Classification Search
CPC ..... G06F 3/021; G02B 6/0035; G02B 6/0055; G02B 6/0066; H01H 13/83
See application file for complete search history.

(56) References Cited

U.S. PATENT DOCUMENTS

| | | | |
|---|---|---|---|
| 6,478,438 B1 * | 11/2002 | Ishikawa .............. | G02B 6/0051 362/330 |
| 2002/0164120 A1 * | 11/2002 | Perner ...................... | G02B 6/43 385/36 |
| 2003/0103359 A1 * | 6/2003 | Chiang ................ | G02B 6/0005 362/85 |
| 2020/0133068 A1 * | 4/2020 | Lu ......................... | G02B 6/0073 |

* cited by examiner

*Primary Examiner* — Stephen G Sherman
(74) *Attorney, Agent, or Firm* — JCIPRNET

(57) ABSTRACT

An illuminated keyboard including a backlight module and a key structure is provided. The backlight module includes a reflector, a light guide plate, a light source, and a light shielding plate. The light guide plate is disposed on the reflector, and a surface of the light guide plate facing the reflector has multiple microstructures. The light source is located on a light incident surface side of the light guide plate. The light shielding plate is disposed on the light guide plate. The light shielding plate has a shielding area and a light transmissive area, and the microstructures are correspondingly disposed in the light transmissive area. The key structure has multiple keycaps. In the microstructures correspondingly disposed under one single keycap, peaks of any two microstructures adjacent to each other keep different distances from the surface of the light guide plate facing the reflector.

6 Claims, 10 Drawing Sheets

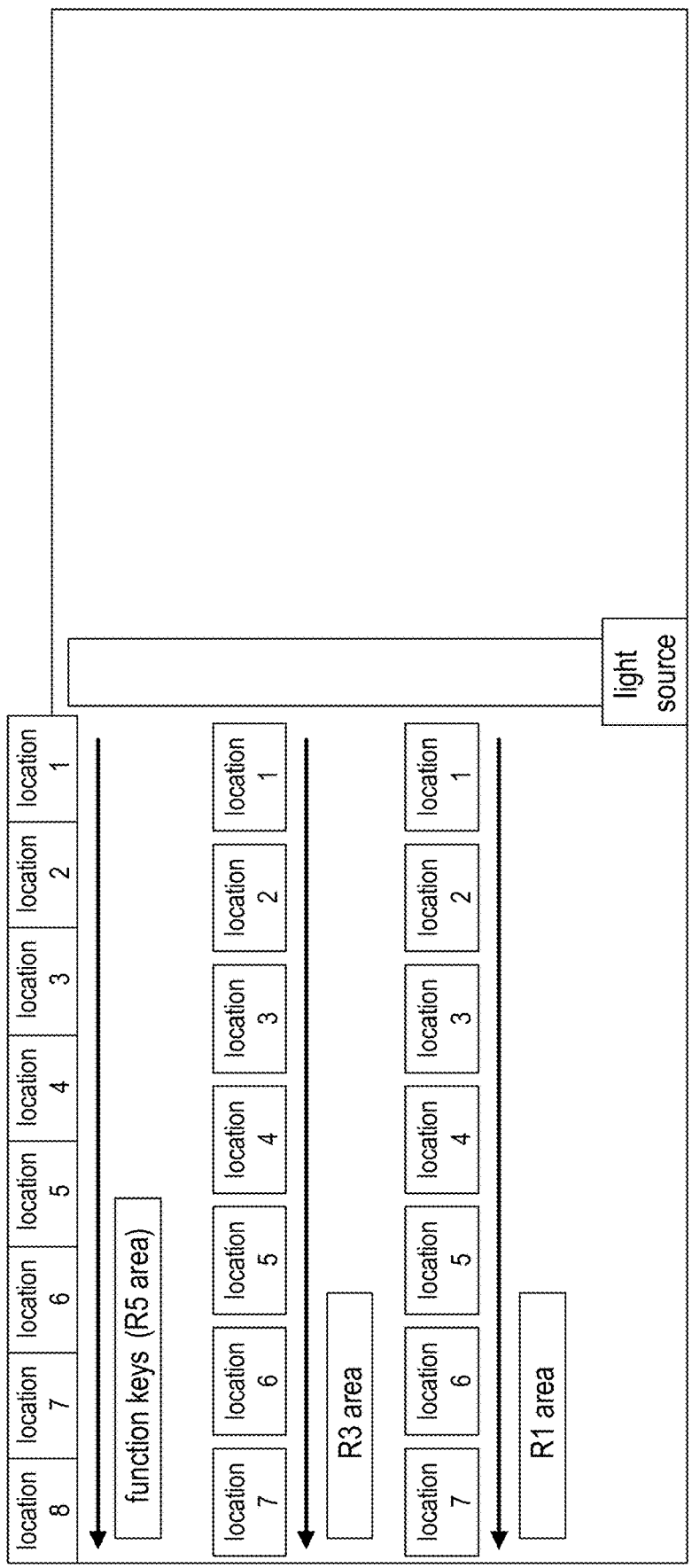

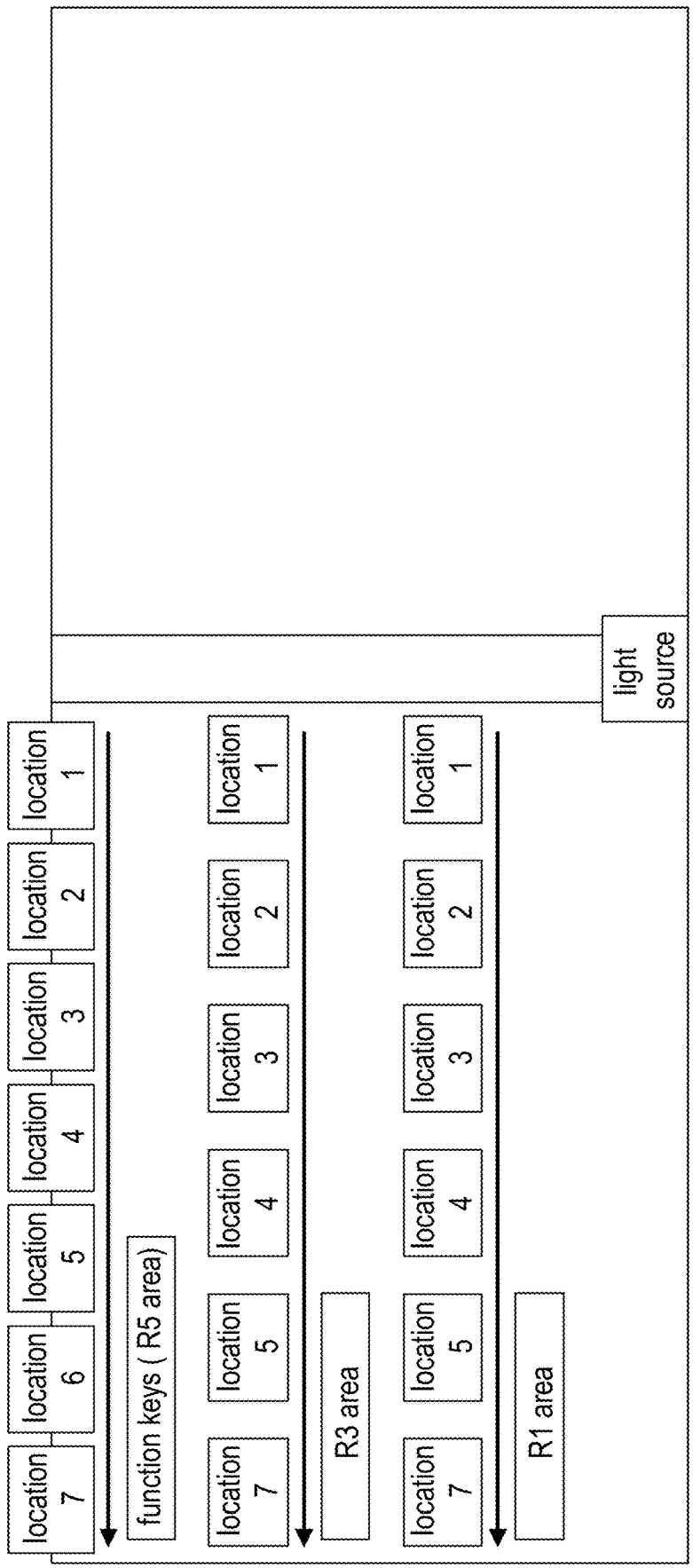

ILLUMINATED KEYBOARD

CROSS-REFERENCE TO RELATED APPLICATION

This application claims the priority benefit of U.S. provisional application Ser. No. 63/145,490, filed on Feb. 4, 2021, and China application serial no. 202123020429.1, filed on Dec. 3, 2021. The entirety of each of the above-mentioned patent applications is hereby incorporated by reference herein and made a part of this specification.

BACKGROUND

Technical Field

The disclosure relates to an illuminated keyboard.

Description of Related Art

FIG. 1 is a schematic diagram of a backlight module of a conventional illuminated keyboard. With reference to FIG. 1, in a conventional backlight module 1, multiple microstructures 22 concave to a light guide plate 2 are disposed on a surface 21 of the light guide plate 2 facing a reflector 3 which is disposed under the light guide plate 2, and these microstructures 22 correspond to the distribution of light transmissive areas 41 of a light shielding plate 4 disposed on the light guide plate 2.

The microstructures 22 are used for changing the transmission path of light emitted by a light source 5 to allow the light to pass through the light transmissive areas 41 and provide a key structure (not illustrated) disposed on the backlight module 1 with luminance.

In the above backlight module 1, the microstructures 22 have the same depth.

However, in this configuration, the light transmitted from the light transmissive areas 41 closer to the light source 5 is relatively bright, while the light transmitted from the light transmissive areas 41 farther from the light source 5 is relatively dim. Therefore, in terms of visual experience, users may feel that the overall luminance of the illuminated keyboard is uneven.

SUMMARY

The disclosure provides an illuminated keyboard with uniform luminance.

An illuminated keyboard of the disclosure includes a backlight module and a key structure. The backlight module includes a reflector, a light guide plate, a light source, and a light shielding plate. The light guide plate is disposed on the reflector, and a surface of the light guide plate facing the reflector has multiple microstructures. The light source is located on a light incident surface side of the light guide plate. The light shielding plate is disposed on the light guide plate. The light shielding plate has a shielding area and a light transmissive area, and the microstructures are correspondingly disposed in the light transmissive area. The key structure has multiple keycaps. In the microstructures correspondingly disposed under one single keycap, peaks of any two of the microstructures adjacent to each other keep different distances from the surface of the light guide plate facing the reflector.

In the embodiments of the disclosure, the microstructures facing the reflector are concave to the light guide plate.

In the embodiments of the disclosure, the microstructures facing the reflector are convex from the light guide plate.

In the embodiments of the disclosure, a portion of the microstructures facing the reflector are convex from the light guide plate, while another portion of the microstructures facing the reflector are concave to the light guide plate. In addition, the microstructures convex from the light guide plate and the microstructures concave to the light guide plate are alternatively disposed.

In the embodiments of the disclosure, the microstructures have surface roughness.

In the embodiment of the disclosure, the microstructures correspondingly disposed under any two of the keycaps adjacent to each other are arranged differently.

Microstructures in a backlight module of a conventional illuminated keyboard are concave to a light guide plate by the same depth, or the farther away from a light source, the deeper the microstructures are. However, this configuration fails to present characters on keycaps of the conventional illuminated keyboard with uniform luminance. Based on the above, in the illuminated keyboard of the disclosure, the microstructures disposed on the surface of the light guide plate of the backlight module facing the reflector are designed according to requirements. The distribution and arrangement of the microstructures are changed and adjusted to present characters on the keycaps of the illuminated keyboard with uniform luminance.

In order to make the aforementioned features and advantages of the disclosure comprehensible, embodiments accompanied with drawings are described in detail below.

BRIEF DESCRIPTION OF THE DRAWINGS

FIG. 6a is a schematic diagram of distances between microstructures of a backlight module and a light source in an illuminated keyboard of a specification.

FIG. 6b is a schematic diagram of distances from peaks of the microstructures to a surface of a light guide plate facing a reflector corresponding to locations in FIG. 6a.

FIG. 7a is a schematic diagram of distances between microstructures of a backlight module and a light source in an illuminated keyboard of another specification.

FIG. 7b is a schematic diagram of distances from peaks of the microstructures to a surface of a light guide plate facing a reflector in several locations selected from FIG. 7a.

DESCRIPTION OF THE EMBODIMENTS

Figure 1:
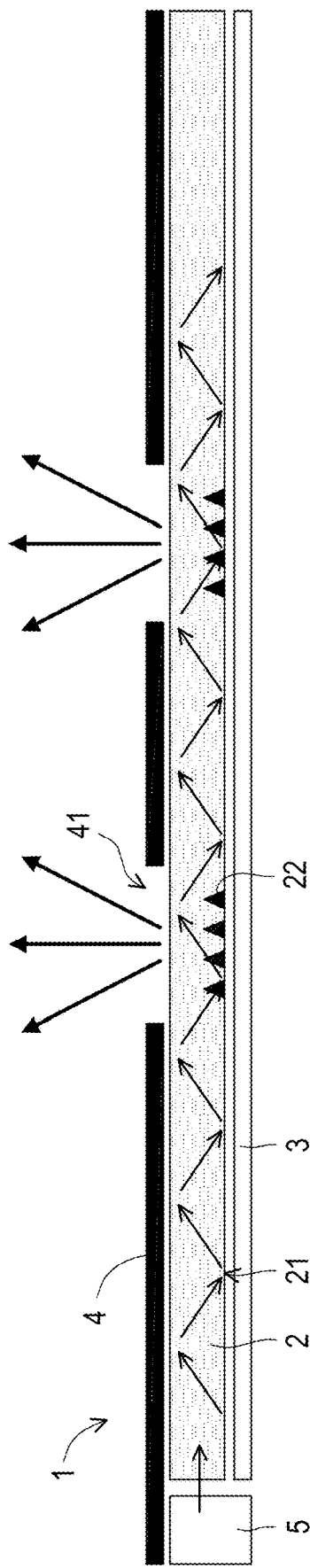
FIG. 1 is a schematic diagram of a backlight module of a conventional illuminated keyboard.
Figure 2:
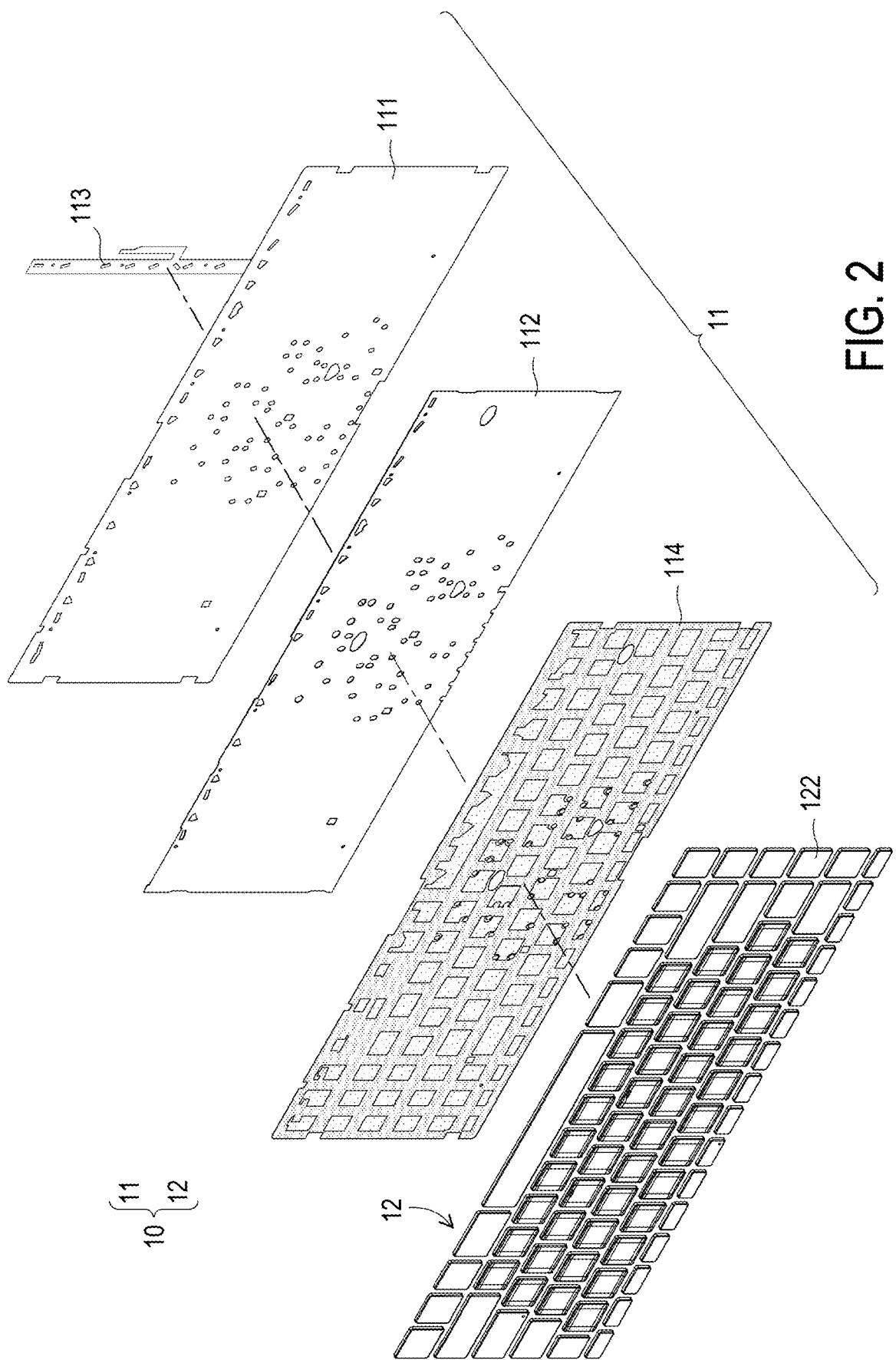
FIG. 2 is an exploded schematic diagram of an illuminated keyboard of the disclosure.
Figure 3:
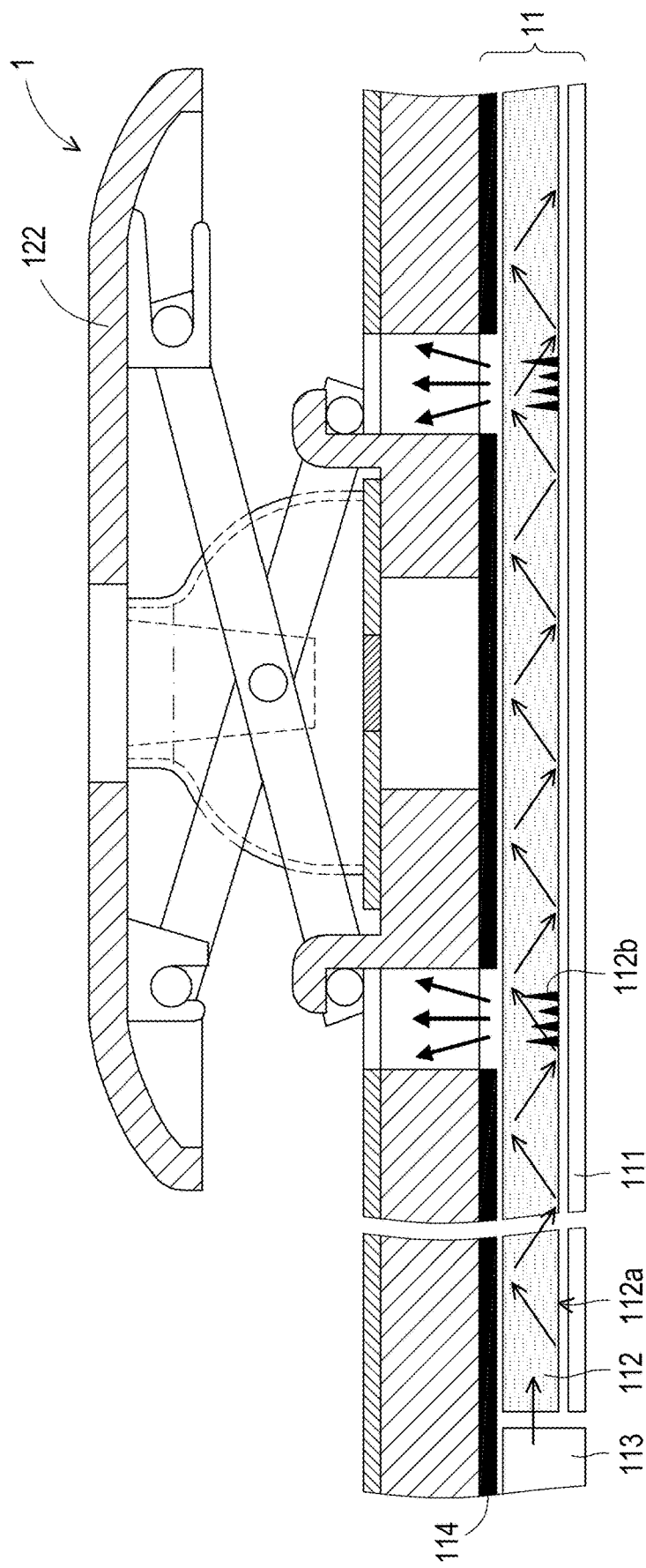
FIG. 3 is a partial cross-sectional schematic diagram of the illuminated keyboard.
Figure 4:
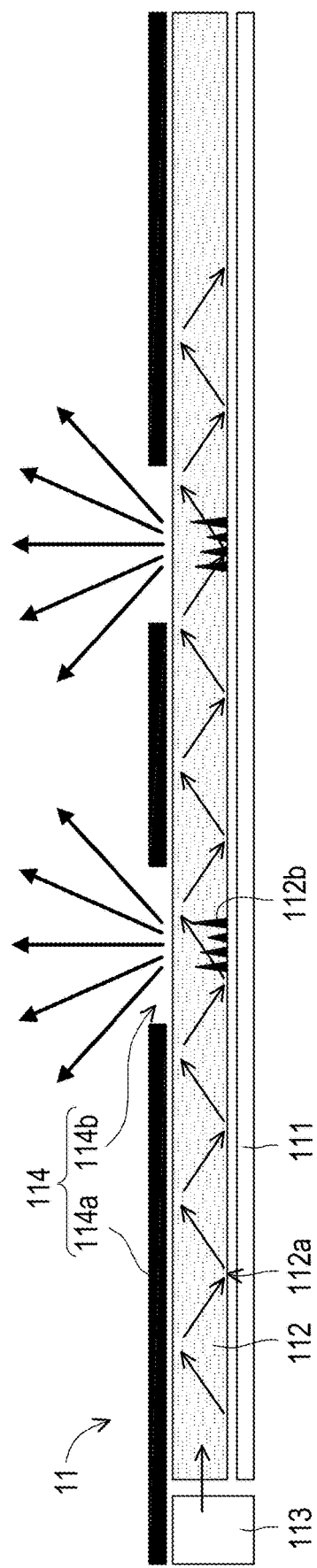
FIG. 4 is a schematic diagram of a backlight module.

FIG. 2 is an exploded schematic diagram of an illuminated keyboard of the disclosure. FIG. 3 is a partial cross-sectional schematic diagram of the illuminated keyboard. FIG. 4 is a schematic diagram of a backlight module. With reference to FIG. 2, FIG. 3, and FIG. 4 together, an illuminated keyboard 10 includes a backlight module 11 and a key structure 12.

The key structure 12 is placed on the backlight module 11, and the key structure 12 has multiple keycaps 122. The backlight module 11 is used for providing the key structure 12 with luminance for users to clearly see characters on all keycaps 122.

The backlight module 11 includes a reflector 111, a light guide plate 112, a light source 113, and a light shielding plate 114. The light guide plate 112 is disposed on the reflector 111, and a surface 112a of the light guide plate 112 facing the reflector 111 has multiple microstructures 112b. The light source 113 is located on a light incident surface side of the light guide plate 112. The light shielding plate 114 is disposed on the light guide plate 112. The light shielding plate 114 has a shielding area 114a and light transmissive areas 114b, and the microstructures 112b are correspondingly disposed in the light transmissive areas 114b.

The light transmissive areas 114b of the light shielding plate 114 may be formed with open holes or by filling the open holes with a light transmissive material, which may be selected according to requirements.

Each keycap 122 corresponds to at least one light transmissive area 114b thereunder. Moreover, in the microstructures 112b correspondingly disposed under one single keycap 112, peaks of any two of the microstructures 112b adjacent to each other keep different distances from the surface 112a of the light guide plate 112 facing the reflector 111.

Specifically, the peaks of the microstructures 112b keep different distances from the surface 112a of the light guide plate 112 facing the reflector 111 and may have various aspects.

Figure 5A:
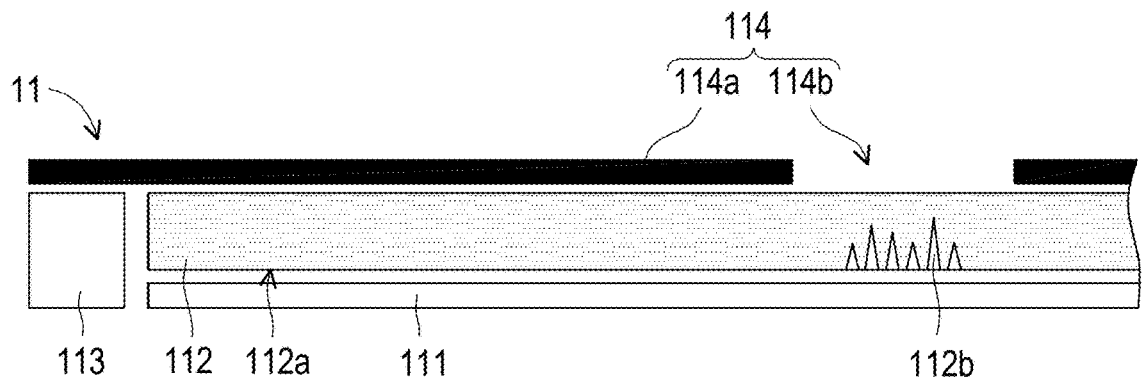
FIG. 5a to FIG. 5c are schematic diagrams of different aspects of microstructures.
Figure 5B:
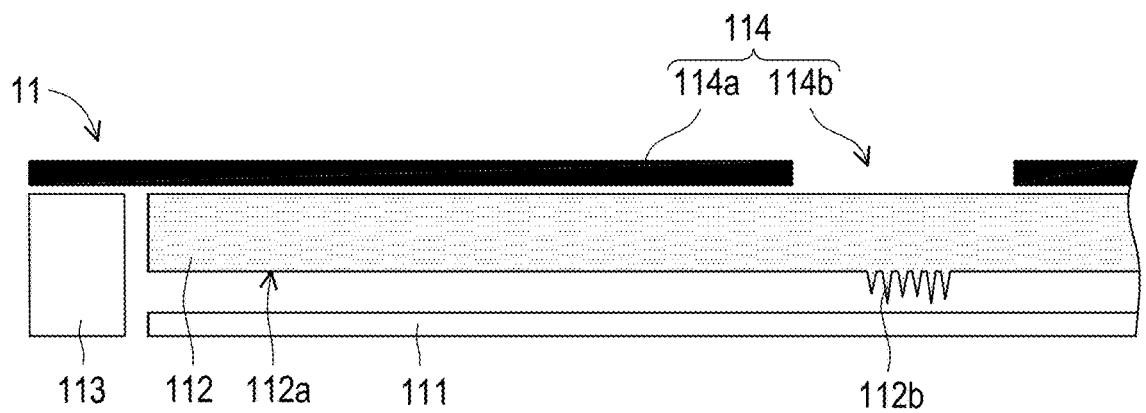
Figure 5C:
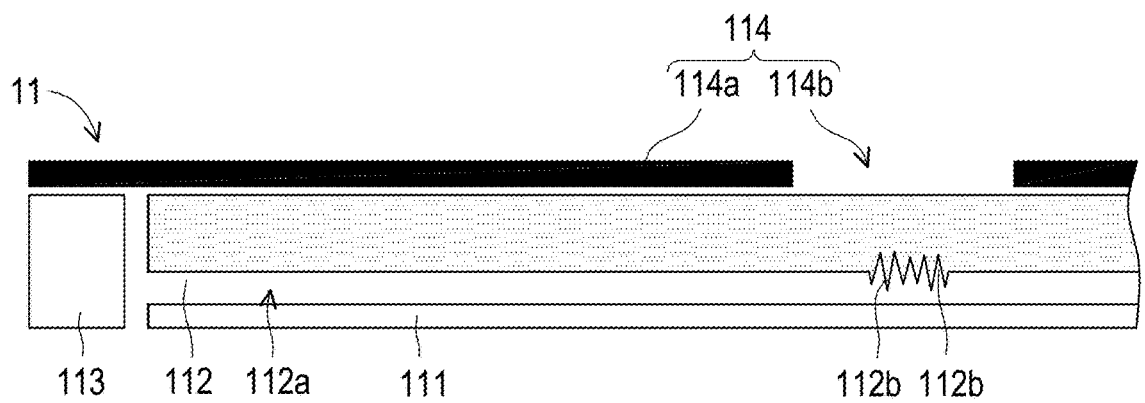

FIG. 5a to FIG. 5c are schematic diagrams of different aspects of the microstructures.

With reference to FIG. 5a, in an aspect, all microstructures 112b facing the reflector 111 are concave to the light guide plate 112, with any two adjacent microstructures 112b concave to the light guide plate 112 by different depths.

With reference to FIG. 5b, in another aspect, all microstructures 112b facing the reflector 111 are convex from the light guide plate 112, with any two adjacent microstructures 112b convex from the light guide plate 112 by different heights.

With reference to FIG. 5c, in still another aspect, a portion of the microstructures 112b facing the reflector 111 are convex from the light guide plate 112, while another portion of the microstructures 112b facing the reflector 111 are concave to the light guide plate 112. The microstructures 112b convex from the light guide plate 112 and the microstructures 112b concave to the light guide plate 112 are alternatively arranged.

In addition, the microstructures 112b have surface roughness. The surface roughness of the microstructures 112b may be intentionally designed. Therefore, the different distances from the peaks of the microstructures 112b to the surface 112a of the light guide plate 112 facing the reflector 111 are partly caused by the surface roughness.

Alternatively, the surface roughness of the microstructures 112b may be caused unintentionally due to demolding of the light guide plate 112 during the manufacturing process.

In particular, when the overall luminance of the illuminated keyboard 10 is found to be uneven, the design of the microstructures 112b is adjusted again, including the relationship between the peaks of the microstructures 112b and the surface 112a of the light guide plate 112 facing the reflector 111, the distances from the peaks of the microstructures 112b to the surface 112a of the light guide plate 112 facing the reflector 111, the arrangement of any two adjacent microstructures 112b, and the like.

In addition, in the embodiments of the disclosure, the distribution of the distances from the peaks of the microstructures 112b to the surface 112a of the light guide plate 112 facing the reflector 111 has no relationship with the distances from the microstructures 112b to the light source 113. In other words, for the microstructures 112b farther away from the light source 113, the distances from their peaks to the surface 112a of the light guide plate 112 facing the reflector 111 are not necessarily greater.

Since the different distances from the peaks of any two adjacent microstructures 112b correspondingly disposed in one same light transmissive area 114b to the surface 112a of the light guide plate 112 facing the reflector 111 change the transmission path of light in the light guide plate 112, the light from the light transmissive areas 114b gives users visual experience that the backlight module 11 presents uniform luminance.

Figure 6B:
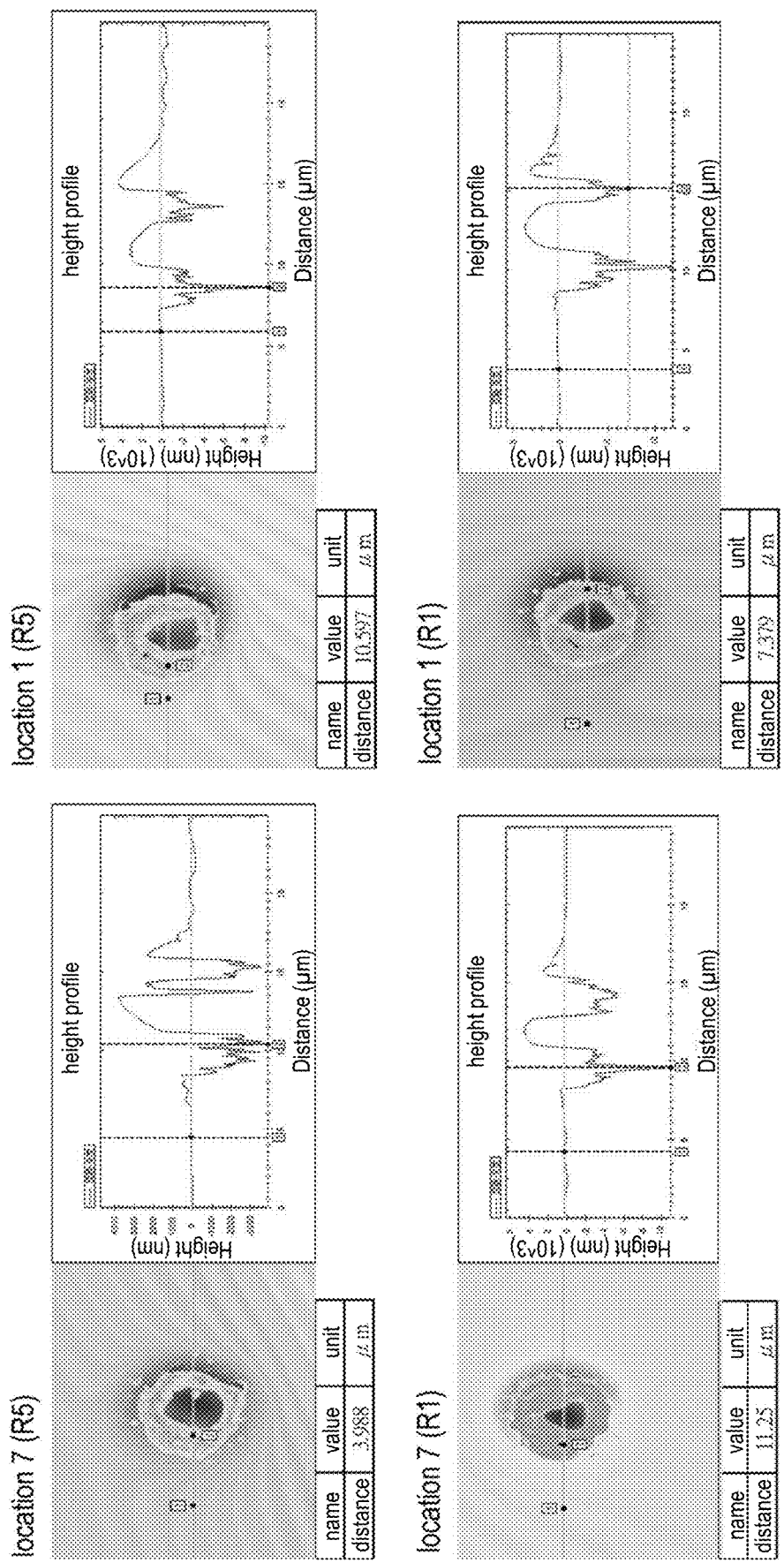

FIG. 6a is a schematic diagram of distances between microstructures of a backlight module and a light source in an illuminated keyboard of a specification. FIG. 6b is a schematic diagram of distances from peaks of the microstructures to a surface of a light guide plate facing a reflector corresponding to locations in FIG. 6a.

With reference to FIG. 6a and FIG. 6b together, in an illuminated keyboard of a specification, with the microstructures distributed as shown in FIG. 5c, the microstructures convex from the light guide plate and the microstructures concave to the light guide plate are alternatively disposed, and the microstructures have surface roughness. In addition, the structure design (depths of being concave to the light guide plate and/or heights of being convex from the light guide plate), distribution, and arrangement of the microstructures at different locations are not completely the same.

Figure 7B:
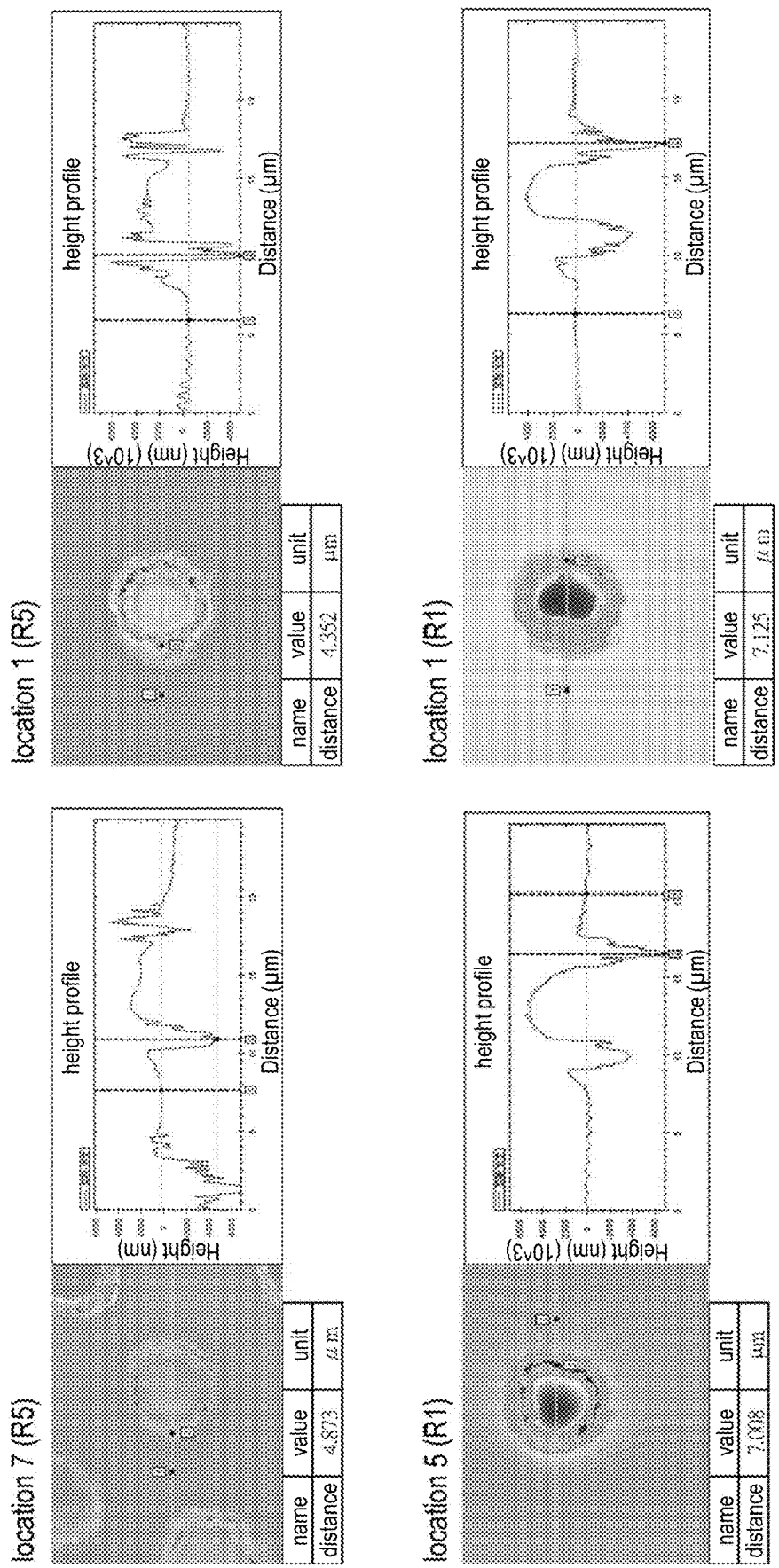

FIG. 7a is a schematic diagram of distances between microstructures of a backlight module and a light source in an illuminated keyboard of another specification. FIG. 7b is a schematic diagram of distances from peaks of the microstructures to a surface of a light guide plate facing a reflector in several locations selected from FIG. 7a.

With reference to FIG. 7a and FIG. 7b together, in an illuminated keyboard of another specification, the microstructures may be distributed as shown in FIG. 5c. Similar to the corresponding illuminated keyboard of FIG. 6a and FIG. 6b, in this illuminated keyboard, the microstructures convex from the light guide plate and the microstructures concave to the light guide plate are also alternatively disposed, and the microstructures also have surface roughness. However, according to the comparison between FIG. 6b and FIG. 7b, even if the inspected locations of illuminated keyboards with different specification are the same, the microstructures at the corresponding locations are designed differently.

Simply speaking, the structure design, distribution, and arrangement of microstructures at the same locations in illuminated keyboards of different specifications are not the same. Furthermore, even in two illuminated keyboards of the same specification, the microstructure design, distribution, and arrangement at the same locations may be different but still achieve the same goal: providing a backlight module with uniform luminance.

In light of the above, in response to the purpose of the disclosure: presenting multiple characters on one single keycap 122 of the illuminated keyboard with uniform luminance, the structure design, distribution, and arrangement of the microstructures corresponding to the one single keycap have design flexibility and may be changed and adjusted according to requirements.

Figure 3A:
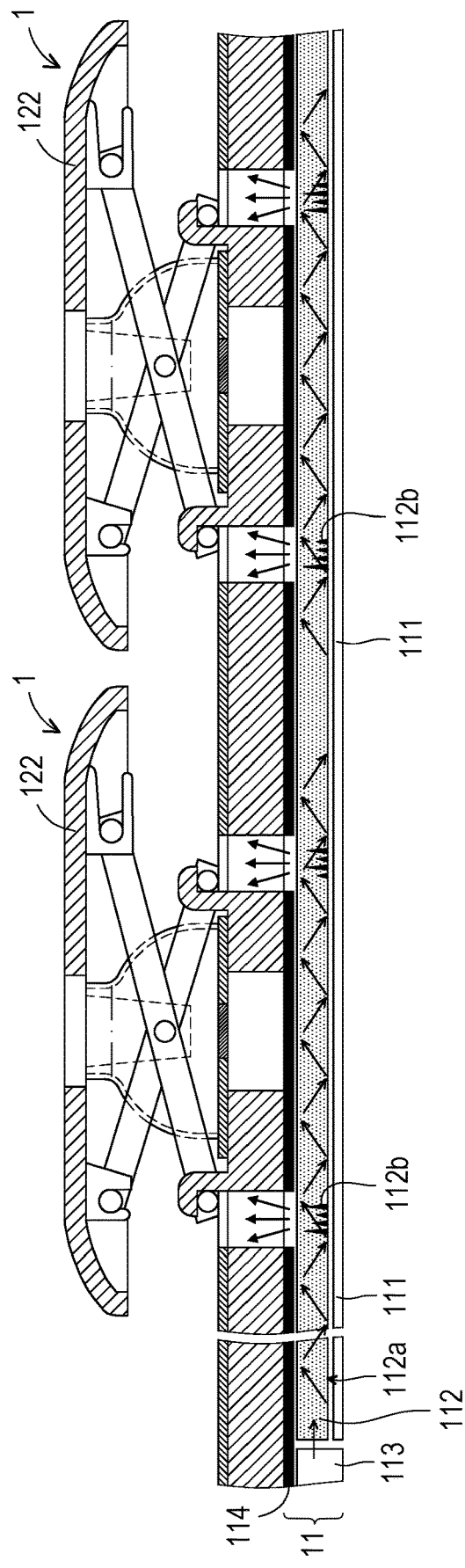
FIG. 3A is a partial cross-sectional schematic diagram of the illuminated keyboard.

In addition, in order to present multiple characters on all keycaps 122 of the illuminated keyboard with uniform luminance, the arrangement of the microstructures 112b correspondingly disposed under one single keycap 122 may further be adjusted. In other words, the arrangement of the microstructures 112b correspondingly disposed under any two adjacent keycaps 122 may be different, as shown in FIG. 3A, wherein FIG. 3A is a partial cross-sectional schematic diagram of the illuminated keyboard showing that the arrangement of the microstructures 112b correspondingly disposed under any two adjacent keycaps 122 is different.

In summary, since microstructures of a light guide plate in a backlight module of a conventional illuminated keyboard are concave to a light guide plate by the same depth, characters on keycaps of the conventional illuminated keyboard in this configuration are presented with uneven luminance. The farther away the keycaps from a light source, the less the provided luminance. In contrast, in the illuminated keyboard of the disclosure, since the microstructures disposed on the surface of the light guide plate of the backlight module facing the reflector are designed according to requirements, changing and adjusting the structure design (depths of being concave to the light guide plate and/or heights of convex from the light guide plate), distribution, and arrangement of the microstructures may avoid the problem that the farther away the keycaps from the light source, the less the provided luminance. In this way, all keycaps on the same illuminated keyboard are provided with the same luminance, and all characters on all keycaps on the same illuminated keyboard are presented with the same luminance. In addition, all characters on one single keycap on the illuminated keyboard may also be presented with uniform luminance.

What is claimed is:

1. An illuminated keyboard, comprising:
    a backlight module, comprising:
        a reflector;
        a light guide plate, disposed on the reflector, wherein a surface of the light guide plate facing the reflector has a plurality of microstructures;
        a light source, located on a light incident surface side of the light guide plate; and
        a light shielding plate, disposed on the light guide plate, wherein the light shielding plate has a shielding area and a light transmissive area, and the plurality of microstructures are correspondingly disposed in the light transmissive area; and
    a key structure, having a plurality of keycaps,
    wherein the plurality of microstructures correspondingly disposed under any two of the plurality of keycaps adjacent to each other are arranged differently,
    wherein in the plurality of microstructures correspondingly disposed under each of the plurality of keycaps, peaks of any two of the plurality of microstructures adjacent to each other keep different distances from the surface of the light guide plate facing the reflector, and distances of the peaks of the plurality of microstructures to the surface of the light guide plate facing the reflector is non-related to distances between the plurality of microstructures to the light source.

2. The illuminated keyboard according to claim 1, wherein the plurality of microstructures facing the reflector are concave to the light guide plate.

3. The illuminated keyboard according to claim 1, wherein the plurality of microstructures facing the reflector are convex from the light guide plate.

4. The illuminated keyboard according to claim 1, wherein a portion of the plurality of microstructures facing the reflector are convex from the light guide plate, while another portion of the plurality of microstructures facing the reflector are concave to the light guide plate, and the plurality of microstructures convex from the light guide plate and the plurality of microstructures concave to the light guide plate are alternatively disposed.

5. The illuminated keyboard according to claim 1, wherein the plurality of microstructures have surface roughness.

6. An illuminated keyboard, comprising:
    a backlight module, comprising:
        a reflector;
        a light guide plate, disposed on the reflector, wherein the light guide plate has a first surface and a second surface, and the first surface faces the reflector and has a first microstructure and a second microstructure, the second surface is opposite to the first surface;
        a light source, located on a light incident surface side of the light guide plate; and
        a light shielding plate, disposed on the light guide plate, wherein the light shielding plate has a shielding area and a light transmissive area; and
    a key structure, having a plurality of keycaps,
    wherein the first microstructure and the second microstructure are disposed under the light transmissive area and concave to the light guide plate, and peak of the first microstructure and the peak of the second microstructure are different, the distance between the first microstructure and the light source is less than the distance between the second microstructure and the light source, and the distance between the peak of the first microstructure and the second surface of the light guide plate is less than the distance between the peak of the second microstructure and the second surface of the light guide plate.

* * * * *